United States Patent [19]

Silbernagel

[11] 4,314,709
[45] Feb. 9, 1982

[54] LOAD TRANSFER TRAILER FOR TRANSIT MIXER

[76] Inventor: Frederick J. Silbernagel, 148-7th SE., Huron, S. Dak. 57350

[21] Appl. No.: 175,062

[22] Filed: Aug. 4, 1980

[51] Int. Cl.³ ............................................. B62D 61/12
[52] U.S. Cl. ............................... 280/81 A; 280/405 R
[58] Field of Search ............. 280/81 R, 81 A, 405 R, 280/43.23; 180/24.02; 366/41

[56] References Cited

U.S. PATENT DOCUMENTS

| | | | |
|---|---|---|---|
| 3,112,100 | 11/1963 | Prichard | 366/41 |
| 3,161,418 | 12/1964 | Brennan et al. | 280/81 R |
| 3,191,961 | 6/1965 | Brennan et al. | 280/81 R |
| 3,246,884 | 4/1966 | Prichard et al. | 366/41 |
| 3,610,653 | 10/1971 | Derrwaldt | 280/81 R |
| 3,704,896 | 12/1972 | Buelow | 280/81 A |
| 3,912,293 | 10/1975 | Harbers | 280/81 R |

*Primary Examiner*—John A. Pekar
*Attorney, Agent, or Firm*—Kinney, Lange, Braddock, Westman and Fairbairn

[57] ABSTRACT

A load transfer trailer which is utilized as an addition to the main frame of a transit concrete mixer and which provides an auxiliary axis assembly to the rear of the normal frame which carries a portion of the load of the mixer. The auxiliary axle assembly can be retracted and stored in a raised position when it is not needed. Control of the auxiliary axle assembly is achieved through the use of a spring for raising the frame for the axle and an air-hydraulic pressure system for lowering the axle. Mechanical latching members that latch the axle and support wheels securely in retracted position are also provided.

13 Claims, 7 Drawing Figures

LOAD TRANSFER TRAILER FOR TRANSIT MIXER

BACKGROUND OF THE INVENTION

1. Field of the Invention

The present invention relates to load transfer trailers for carrying a portion of the load on a truck, such as a transit mixer.

2. Prior Art

In the prior art various forms of trailers or auxiliary axle assemblies have been utilized at the rear of frames on large trucks. For example, U.S. Pat. No. 3,112,100 shows such a frame assembly which has a hopper that is attached thereto and which can be used for loading material into the mixer itself.

Additionally, a device for carrying a portion of the load through an auxiliary axle that can be selectively engaged with the ground is shown for example in U.S. Pat. No. 3,161,418. U.S. Pat. No. 3,191,961 illustrates a tag axle assembly that can be raised from a working position up into a storage position, and this patent includes an accumulator so that the amount of load being carried on the rear axle is limited by the pressure in the accumulator.

Jointed arms for holding a rear axle assembly are shown in U.S. Pat. No. 3,246,884 and this device includes latches which hold the unit in a locked position. Air bags that are used for actuating auxiliary axles are shown in U.S. Pat. No. 3,704,896. A separate hydraulic cylinder is used in this particular patent for lifting the tag axle when the pressure in the air bags is released. Air bellows also are used directly at the axle in U.S. Pat. No. 3,912,293, which has a jointed arm assembly that folds to place the wheels close to the ground when the assembly is folded.

SUMMARY OF THE INVENTION

The present invention relates to a load transfer trailer comprising an auxiliary axle assembly having wheels which engage the ground. The assembly includes an auxiliary frame mounted to the rear of the frame of a truck, such as a transit mixer. The axle is mounted on a jointed, pivoting frame. The base portion of the pivoting frame is mounted to the frame of the truck about suitable horizontal pivots and a spring means is utilized for urging the base portion of the frame into a retracted or raised position.

The rear portions of the jointed pivoting frame comprise arms that support a cross axle having wheels at its ends. The arms are pivoted relative to the base portion of the frame and move about the arm pivot through the use of hydraulic cylinders. The cross axle moves with the arms about the arm pivot between a lowered position and raised position.

As shown, release latches that hold the load transfer trailer auxiliary axle assembly in a raised position are automatically released when the arms are moved toward a lowered position by operating the hydraulic cylinder. Once the arms have been moved toward their lowered position sufficiently to release the latches, air bag means comprising fluid pressure cylinders are inflated to urge the base portion of the frame, which carries the arm toward the ground to transfer a portion of the load from the main truck frame to the wheels on the auxiliary axle assembly.

By regulating the air pressure in the bags the amount of load carried by the auxiliary axle assembly can be controlled, and thus the load from the truck, such as a concrete mixer can be more evenly distributed.

As shown in the first form of the invention, the spring means for urging the base portion of the frame into a retracted or raised portion is a pair of leaf springs. When the auxiliary axle assembly is to be retracted, all that need be done is to release the air from the air bags, and the leaf springs automatically will lift the base portion of the trailer frame upwardly.

As shown in the second form of the invention, the spring means for urging the base portion of the frame into a retracted or raised position is a second pair of air bag means. The second air bag means is deflated while the first air bag means is inflated to urge the base portion of the frame to the ground. The first air bag means positions the load transfer trailer to support part of the load of a transit mixer, while the second air bag means serve to retract the load transfer trailer. By inflating the second air bag means and simultaneously deflating the first air bag means, the base portion of the trailer frame is urged into a retracted or raised position.

After retraction of the base portion of the trailer frame in either form of the invention, operating the hydraulic cylinders in an opposite direction will cause the arms to pivot relative to the base portion of the frame and the latches will reengage. The auxiliary axle assembly will be lifted so that the wheels clear the ground and are positioned above the general frame line of the truck.

DESCRIPTION OF THE PREFERRED EMBODIMENTS

Figure 1:
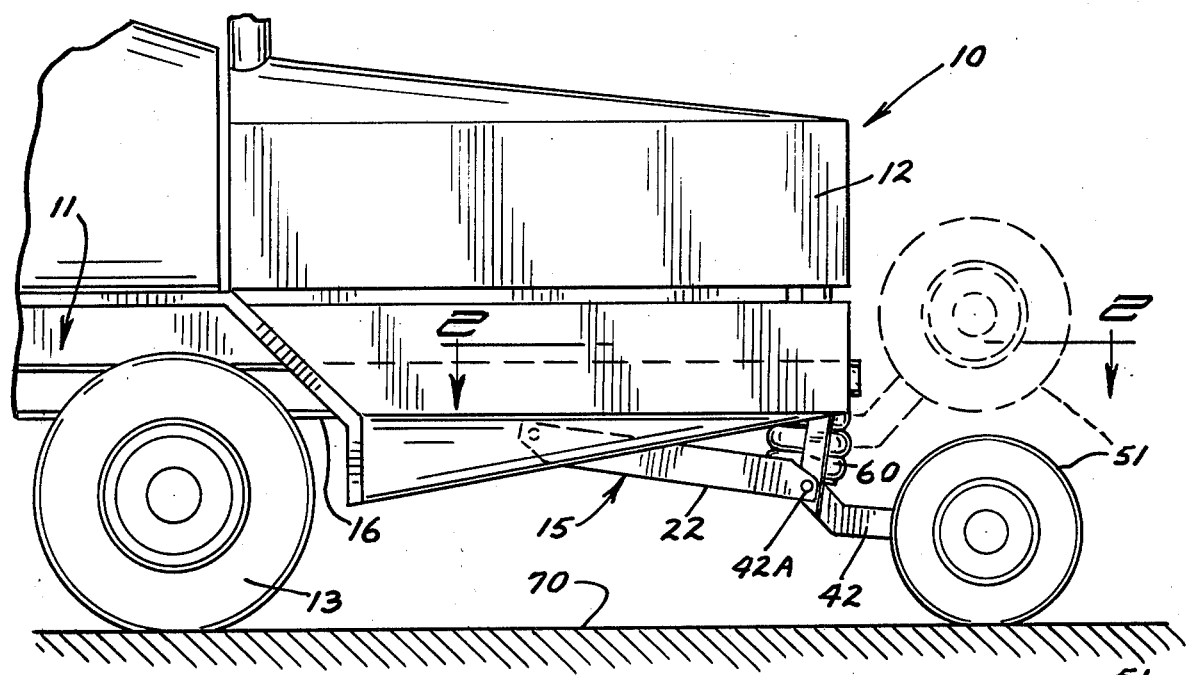
FIG. 1 is a fragmentary side view of the rear portion of a transit mixer truck having a load carrying auxiliary frame or trailer mounted thereon.
Figure 2:
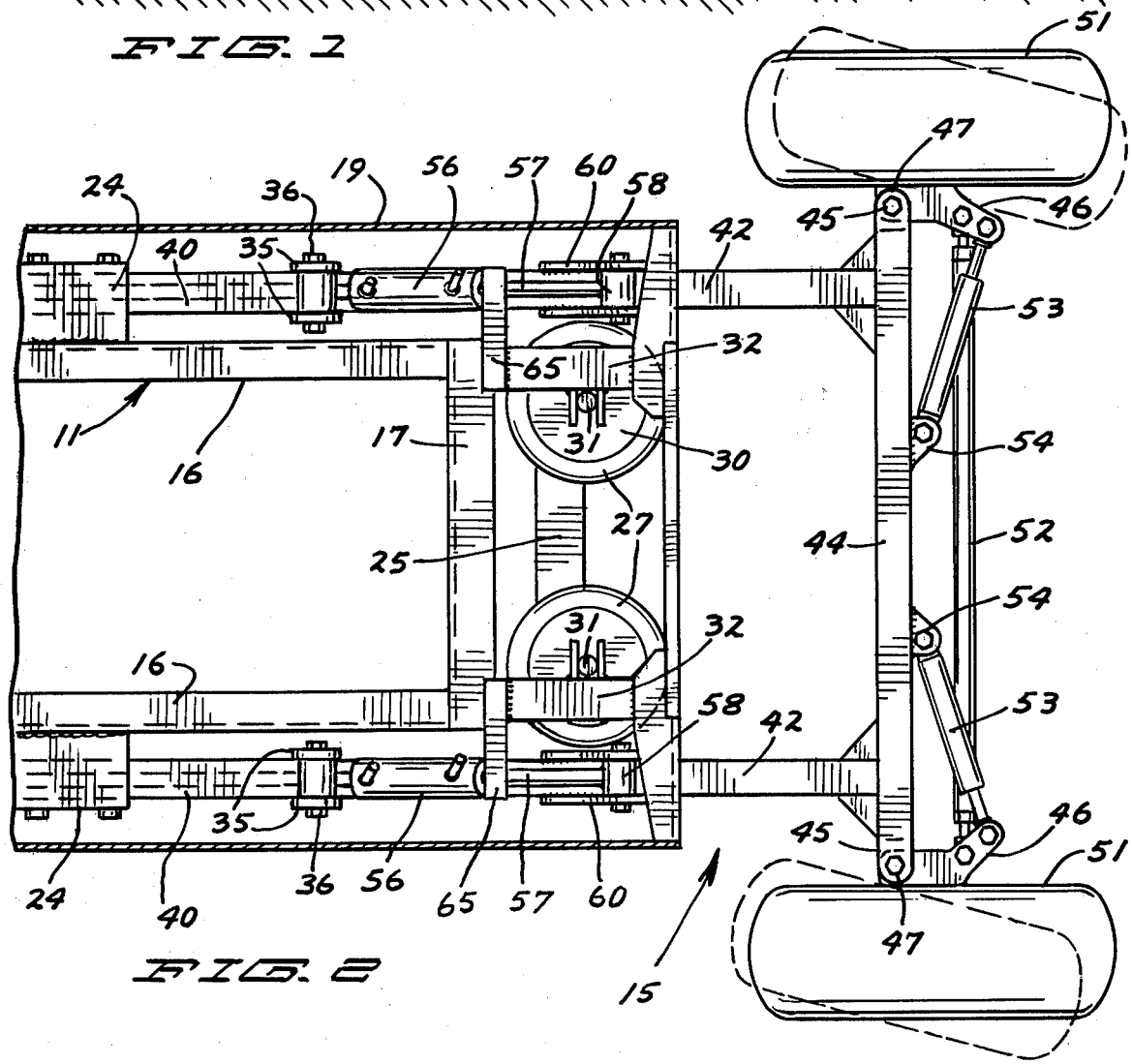
FIG. 2 is a top view taken generally along line 2—2 in FIG. 1.

In FIG. 1, the rear portions indicated generally at 10 of a concrete mixer truck are shown. These rear portions are of the type of truck shown in U.S. Pat. No. De. 249,665, and includes a main truck frame 11. The frame 11 supports a rear mounted engine 12 in this truck which is a front discharge mixer truck. A rear drive axle 13 is mounted in the usual manner to the frame 11.

The concrete mixer assembly in this particular unit is a front discharge mixer. Because substantial loads are involved it becomes desirable to carry auxiliary or trailer axle assemblies. A load distributing rear axle assembly shown at 15 is pivotally mounted relative to the truck frame 11 and is made so it can be raised and lowered relative to the truck frame 11 to selectively carry a portion of the weight of the truck on the auxiliary axle assembly. The frame 11 includes a pair of side frame members 16,16 and a cross member 17 at the rear of the side frame members 16. The auxiliary axle assembly is made up of a pair of frame portions, which include a base frame portion 21 and a pivoting arm frame portion 20. The base frame portion 21 comprises a pair of rearwardly extending side frame members 22,22 which are pivotally mounted at the forward ends thereof on suitable pivot pins 23 that extend through the legs of a saddle or bracket member 24 that is welded onto each of the respective side frame members 16 of the main frame 11 of the truck. The side frame members 22 are coupled together with a cross member 25 forming a part of the base frame portion and which is positioned to the rear of the rear cross member 17 of the truck main frame, and as can be seen is near the outer end of the side frame members 22.

The cross member 25 in turn has a pair of air spring or bellow support plates 26 fixed thereto, and each of the support plates 26 supports an air spring 27 which comprises a bellows type airtight bag that expands in vertical direction when it is filled with air, but which will collapse or compress in vertical direction when external forces tend to cause it to collapse.

The upper ends of the air springs 27 are supported against reaction plates 30,30, each of which in turn is supported by a suitable bracket 31 that is mounted onto a rearwardly extending arm 32. The arms 32 are rigidly supported back to the truck main frame 11, and thus the extension of the air springs 27 results in downward movement of the cross member 25, and corresponding pivotal movement of the side frame members 22.

Figure 3:
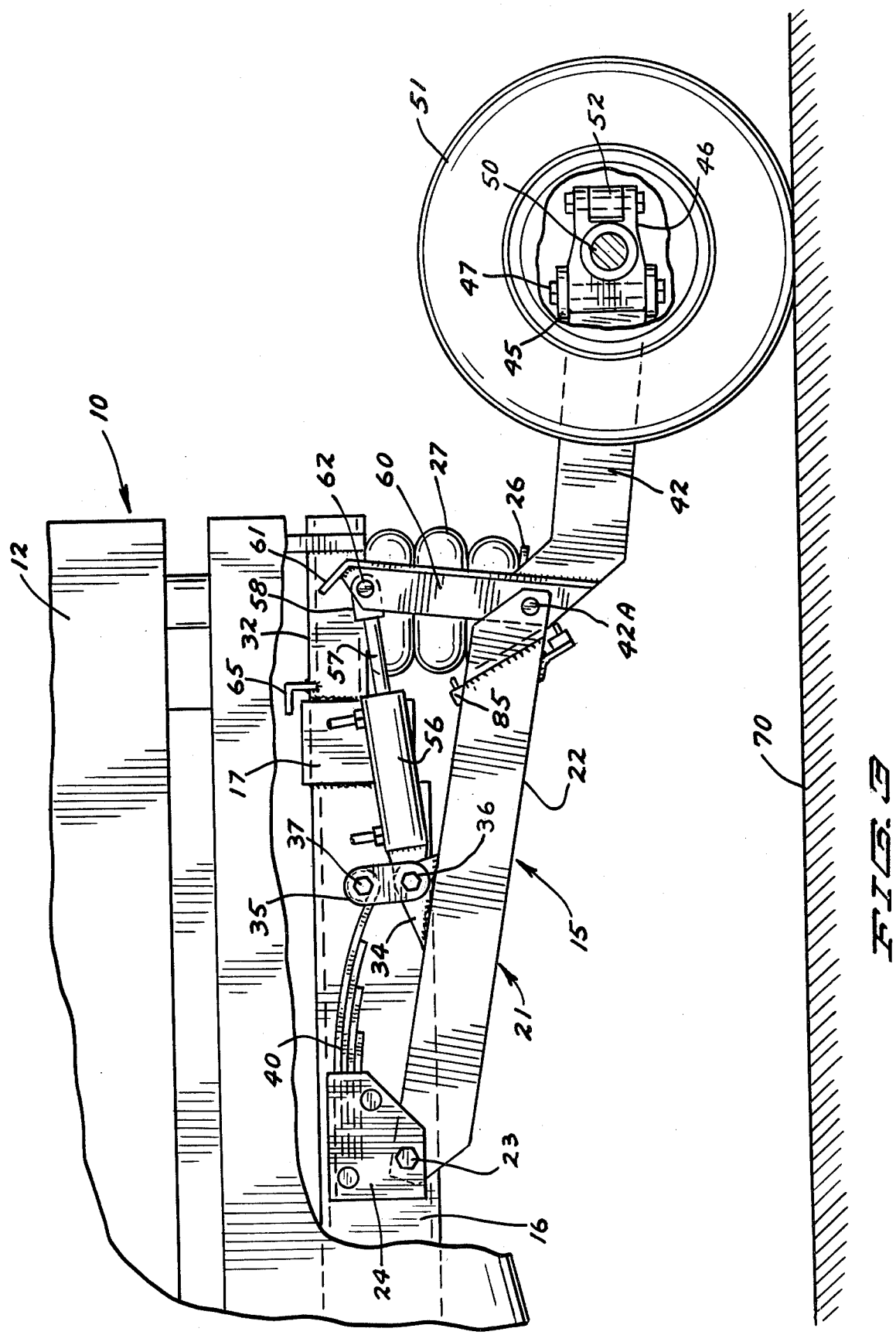
FIG. 3 is a fragmentary enlarged side elevational view of the device of FIG. 1 with parts broken away.
Figure 4:
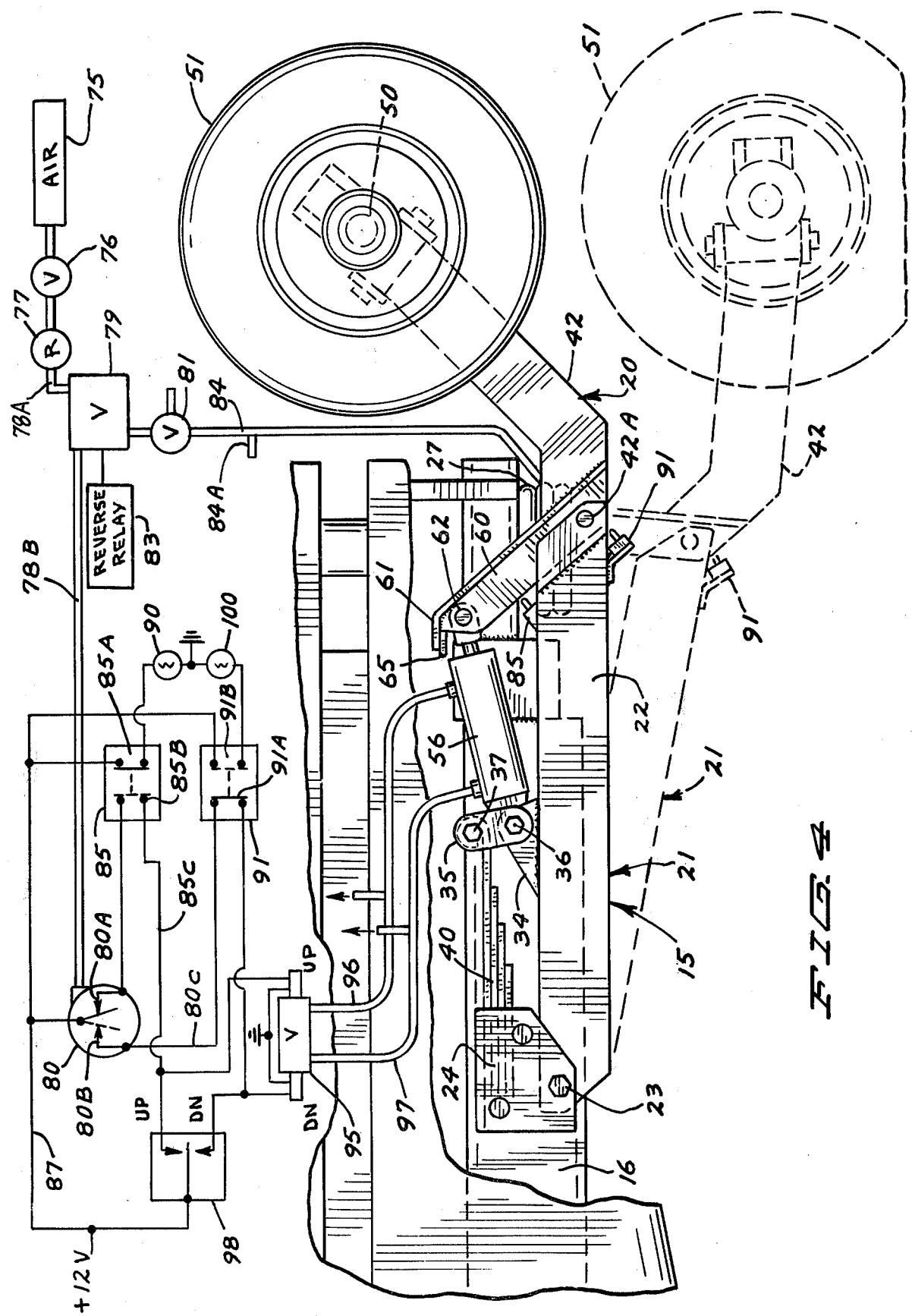
FIG. 4 is a view on substantially the same line as FIG. 3 with the auxiliary frame assembly and the axle in a raised or retracted position and including a schematic representation of the control circuits used for operation.

Each of the side frame members 22 has a pair of ears 34,34 welded to the top thereof. The side frame members 22 are square tubes as shown and have a flat upper wall. The ears 34 are spaced apart, on each of the side frame members 22 and a spring shackle 35 is mounted on each of the separate pairs of ears with a suitable pin 36 that passes through both of the ears. The pin 36 also is used for mounting the base end of the hydraulic cylinder, as will be explained. The spring shackles comprise a pair of side bars, as is usual. The shackles on each member 22 extend upwardly from the pin 36. The upper end of the shackles 35, on each side of the truck main frame are mounted with a pin 37 to the outer end of a leaf spring assembly 40. The leaf spring assembly 40 as shown has a base end portion mounted in the bracket member 24 on each side of the frame. The leaf spring 40 is held in the bracket member 24 in a suitable manner so that it is retained therein and cantilevers outwardly. The mounting can be done with suitable support bolts as shown in FIG. 3. The base end of the leaf spring 40 on each side of the truck frame is positioned above the pivot pin 23 for the side frame members 22 of the auxiliary frame. The spring assemblies 40 exert an upward force tending to pivot the side frame members 22 upwardly, through the shackles 35 and pin 36. The retracted position of the side frame portions 22 is substantially parallel to a horizontal plane as shown in FIG. 4.

The auxiliary axle frame assembly 15 further includes a pair of arms 42,42 which are pivotally mounted with suitable pins shown at 42A about a horizontal axis at the outer ends of the side frame members 22 of the base frame portion 20. The arms 42 are each mounted between a pair of plates that are attached to the ends of the base portion side members, and the arms 42 mount a cross axle 44. The outer ends of the axle 44 have support brackets 45 mounted thereon. The support brackets 45 are much like yokes which receive wheel spindle supports 46, and the supports 46 in turn are mounted with suitable king pins or pivot pins 47 in the brackets 45. The spindle supports 46 mount wheel spindles 50, which in turn have wheel hubs and tires 51 rotatably mounted thereon. The outer ends of the spindle support brackets 46 are connected together with a tie rod 52. Suitable dampeners or shock absorbers 53 are provided between brackets 54 on the axle 44 and the spindle support brackets 46 to dampen any oscillation. The wheel and tire assemblies 51 are thus caster wheels which pivot about the pivot pins 47, but which are dampened by the shock absorbers or dampening members 53 so that they don't tend to oscillate in use.

The movement of the arms 42, and thus the cross axle 44 and connected wheels 51 relative to the side member 22 of the base portion of the frame is controlled with suitable hydraulic cylinders 56 which have their base ends connected to the side member 22 through the bracket 34. The cylinders 56 have extendable and retractable rods 57 having rod ends 58 which are connected to upright levers 60 that in turn are fixed to the arms 42, respectively. The upright levers 60, as shown, have latch fingers or portions 61 at their outer ends adjacent the rod ends 58. The rod ends 58 are connected to the levers 60 with a suitable pin 62 at the upper ends as shown in FIGS. 3 and 4.

The latch fingers 61 are connected to the levers 60 so that when the rods 57 of the levers 56 are retracted, and the side frame members 22 of the base frame are in their raised position under the urging of the springs 40, the latch fingers 61 will each fit over a respective angle iron latch support 65 that is mounted on each side of the frame assembly in a desired position and which extend outwardly from the supports 32. The latch fingers 61 are made so that they will mate with the latch supports 65, as shown in FIG. 4 and provide a mechanical support to prevent the frame from tending to bounce. Of course the latch supports 65 and the latch fingers 61 are suitably positioned so that they don't interfere with other portions of the assembly when they are in their latched position.

With the auxiliary axle assembly in its raised position as shown in FIG. 4, the cylinders 56 have to be extended so that the rods move the levers 60 clockwise as shown in FIG. 4, thereby lowering the wheel assemblies and moving the latch fingers 61 away from the latch support 65 on each side of the unit. When the rods of the cylinders 56 have been fully extended, air is supplied to the air springs 27, which provide enough force to overcome the leaf springs 40 and lower the base frame portion 20 until the wheels contact the ground indicated at 70. The load with which the wheels contact the ground is determined by the pressure of the air in the air springs 27. The retraction is done by removing the air pressure from the springs 27, which causes the springs 40 to lift the entire auxiliary axle assembly 15 upwardly, until the base frame portion 20 is in its position substantially horizontal as shown in FIG. 4. Then the hydraulic cylinders 56 are retracted until the latch members 61 fit over the latch supports 65 and hold the unit securely.

In FIG. 4, the schematic representations of the air, hydraulic and electrical circuits for operating the auxiliary axle assembly of the present invention are illustrated. The operator control is of course in the cab, and is basically the air control for regulating air pressure in the air springs or bags 27. Once the operator has provided air or shut off the air, the sequence of operation becomes automatic, primarily because of the lifting action of the leaf springs 40 which will lift the base frame 21 upwardly.

As shown in FIG. 4, an air source 75 is an ordinary air tank normally found on large trucks, and the tank itself is connected to the trailer control by a manual valve 76 which is located in the operators cab of the truck for the auxiliary axle assembly. The on-off valve 76 is the main control. A pressure regulator 77 is utilized for obtaining the desired pressure in the system. Air pressure is provided through a conduit 78A to a three-way air valve 79, and through a conduit 78B to a pressure switch 80.

The three-way valve 79 is connected to normally pass air through to a quick release or dump valve 81. The valve 79 also is controlled by a relay 83 which is connected to dump the air when the relay receives a signal indicating that the truck is in reverse, such as from the back-up light switch. The valve 81 is a purchased valve that provides an output as a proportion of its input pressure as the input is building up, but dumps the air pressure on the output to exhaust as soon as the pressure reverses on the input. That means that upon initial turning on of valve 76, air will flow through regulator 77 and valve 79 to valve 81 and out to conduits 84 and 84A. Conduits 84 and 84A are connected to the air bags 27. The air bags 27 are connected in parallel. The trailer is in its solid line position shown in FIG. 4. The side frame members 22 have been raised upwardly. The hydraulic cylinders 56 are in their retracted position. One of the arm members 60 is contacting a limit switch 85 that is shown schematically in FIG. 4 and also down near the outer end of the side frame member 21 shown in FIG. 4. The limit switch 85 is normally in the dotted position shown in FIG. 4, but when the cylinders 56 are retracted, the normally open contacts indicated at 85A are closed. Also, when there is a low pressure signal on conduit 78B, the pressure switch 80 is in its solid position shown in FIG. 4 closing a normally closed contact indicated at 80A. Power is supplied by a 12 volt source along a common line 87, and as can be seen with contacts 85A of limit switch 85 closed power is provided to an "up" indicator light 90 that is mounted in the truck cab.

A second limit switch 91 which is mounted on the outer end of one side frame member 21 is a down limit switch, and as shown has normally closed contacts 91A that are closed with the unit in this position as shown in FIG. 4. Switch 91 also has normally open contacts 91B which are closed when the arm 60 is moved to a position with the cylinders 56 extended and the wheels are in the down position as shown in FIG. 4 in dotted lines.

The hydraulic cylinders 56 are controlled by a four-way solenoid operated valve 95 which is connected to a suitable source of pressure and reservoir (not shown) in a normal manner. In addition, suitable relief valves can be provided in the circuit wherever desired. The cylinders 56 also are connected in parallel as shown by the T connections in conduits 96 and 97, respectively which lead to the cylinders on the opposite sides of the truck. A manual override switch 98 is provided in the truck cab, so that if desired the operator can merely move the actuator button and close circuits to the valve 95 to operate the cylinder 56 to selectively extend or retract.

When the auxiliary trailer is to be used, so that the wheels 51 are contacting the ground carrying some load, valve 76 will be operated by the operator in the cab of the truck to provide fluid under pressure to the lines 78A and 78B. Fluid through valves 79 and 81 will extend the air springs 27 under the pressure as regulated by regulator 77.

As the pressure in air springs or bags 27 increases the force will overcome the force of the springs 40. As pressure increases in line 78B pressure switch 80 will be activated to close the contact 80B, and provide a 12 volt signal along a line 80C through the normally closed contacts 91A of limit switch 91 to one side of the solenoid valve 95, thereby energizing the valve 95 and providing fluid under pressure to the down conduit 97 for both of the cylinders 56. This will cause the cylinders 56 to extend, and pivot the arm assembly 20, including both of the arms 42, about the pin 42A to tend to move the arm assembly to the down position.

As soon as the arms 60 move, the limit contacts 85A of limit switch 85 will be opened, and light 90 will go out. The cylinders 56 will continue to extend as the base portion 21 of the frame lowers against the spring load of springs 40. The arms 60 will reach the dotted line position shown in FIG. 4 wherein they will contact the limit switch 91 causing contacts 91A to open and contacts 91B to close. When contacts 91A open the solenoid valve 95 will be relaxed to its neutral position thereby blocking any flow to or from the cylinders 56. Closing the contacts 91B energizes an indicator lamp 100 which is the "down" indicator lamp. Switch 80 will be in its dotted line position so that the contact 80A is not connected to the line 87.

When the axis assembly is in its down position the amount of load carried by the axle will depend upon the setting of the air pressure regulator 77 which can be adjusted as desired to proportion the load. This can be adjusted even in use as the loads on the truck change.

When the auxiliary trailer is no longer to be used, and it is desired to raise the wheels 51 away from the ground 70, the operator will close valve 76. This shuts off all airflow to valve 81. The valve bleeds off a small amount of air on the input side and as soon as the input pressure drops, the valve 81 is made to dump the air from the bags 27 to atmosphere. As soon as the pressure signal in conduit 78B drops below a desired level, the switch 80 will be relaxed and contact 80A will again be connected to line 87 thereby energizing the line leading to contacts 85B of switch 85. Because limit switch 85 is in its normal position, (arms 60 are in their down position and are moved away from limit switch 85), the contacts 85B are closed and the circuit is therefore completed to the "up" solenoid of the valve 95 through a line 85C.

Fluid under pressure is provided to conduit 96, and connect conduit 97 to drain, thereby retracting the cylinder 56. As soon as the cylinders 56 start to retract and the arms 60 pivot so that limit switch 91 is no longer contacted, the indicator light 100 will go out, and contacts 91A will close. However, again, pressure switch 80 is in its solid line position as shown in FIG. 4 and contact 80B is open so no circuit to the down side of valve 95 will be completed until contacts 80B close.

The cylinders 56 will continue to retract through the circuit completed by contact 85B and at the same time, the springs 40 will be lifting the base frame portion 21 and causing air to exhaust from the air bags 27. The base frame portion 21 is moved upwardly so that the side frame members 22 are raised. When the arms 60 reach their solid line position, limit switch 85 will be contacted thereby opening the contact 85B causing contacts 85A to close and again completing the circuit to the indicator lamp 90 which indicates the axle assembly is in its "up" position.

When the axle assembly is again to be lowered, the process is repeated.

The air bags may be air springs made by Firestone Tire Company.

The air valves used are conventional pneumatic valves. The quick release valve 81 may be a model MN-314B valve made by Williams Air Brake Division of Dana Corporation. This type of quick release valve is used for rear brakes on a semitrailer and is sensitive to reduction of supply pressure. The use of relay 83 is to dump the air if the truck is placed in reverse. The relay may be directly operated by a switch such as a back-up switch. The valve 81 may also be replaced with a solenoid valve controlled from the operator's cab.

The mounting of the rear spindle carrier in yokes 45 permits readily interchanging the spindles if different wheels and spindles are desired for different applications.

Figure 5:
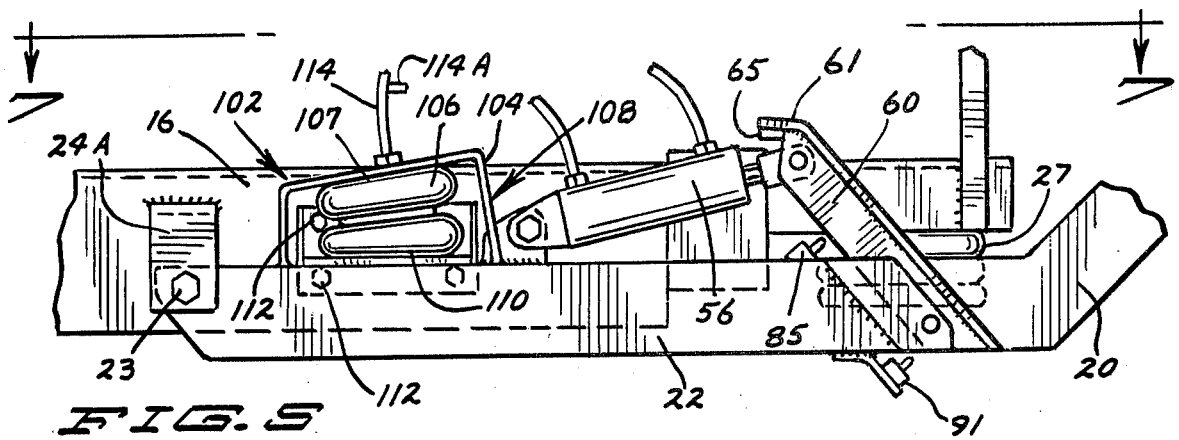
FIG. 5 is a partial side view of an alternate form of the retraction means of the load transfer trailer shown in a raised or retracted position.
Figure 6:
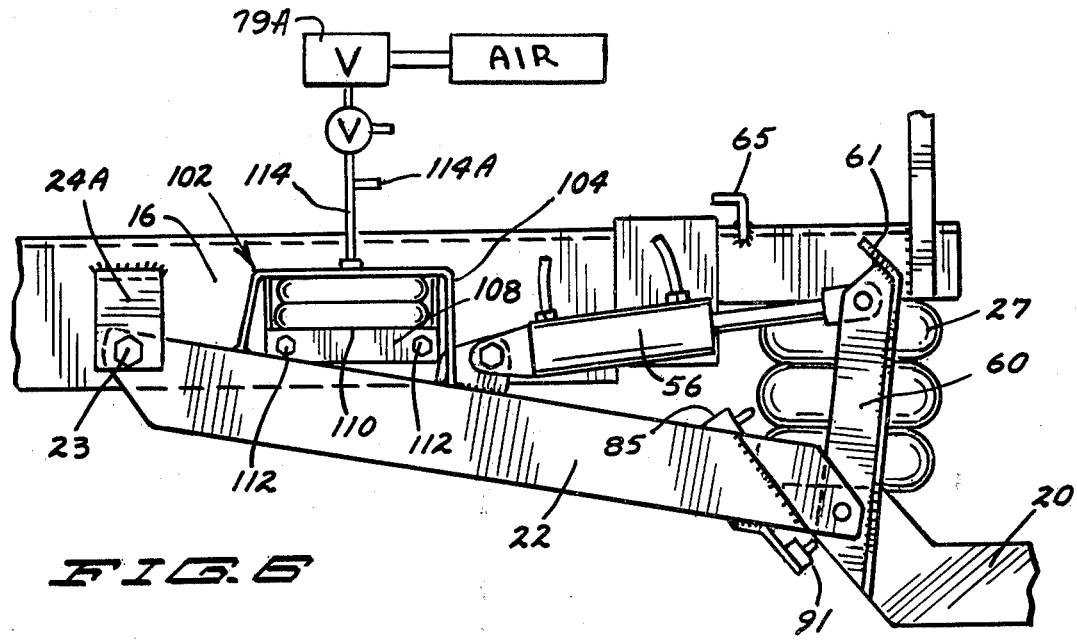
FIG. 6 is a partial side view substantially the same as FIG. 5 with the load transfer trailer in its operational position.
Figure 7:
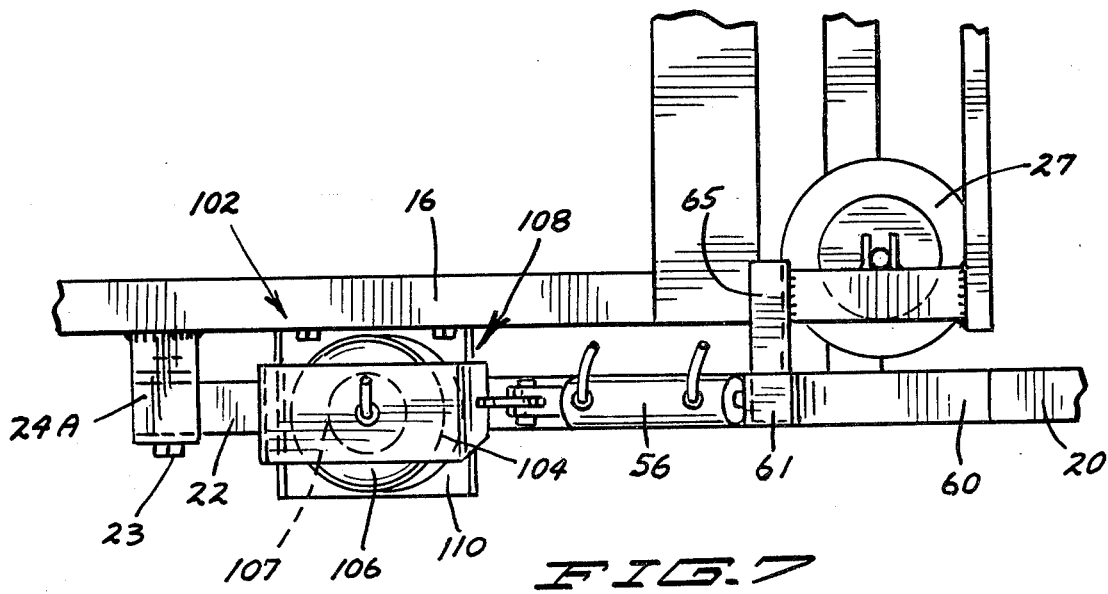
FIG. 7 is a top view taken generally along line 7—7 in FIG. 5.

The modifications shown in FIGS. 5, 6 and 7 is basically similar to the first form of the invention with the exception that a pair of air spring assemblies 102,102 are employed to retract the auxiliary axle assembly instead of leaf spring assemblies 40. As shown, a member 104 is attached to each side frame member 22 such that member 104 extends over an air spring 106. Air spring 106 comprises a bellows type air bag that expands in a generally vertical direction when it is filled with air, but which will collapse or compress in a similar direction when internal pressure is released and external forces tend to cause it to collapse.

The upper end of each air spring 106 is supported against a reactor plate 107 connected to member 104, which in turn is connected to side frame member 22. The bottom end of each air spring 106 is connected to and supported by an air spring or bellow support panel assembly 108, which has a air spring support panel 110. Air spring support panel assembly 108 is attached to side frame member 16 by suitable means, such as bolts 112 as shown in FIG. 6.

Each side frame member 22 is pivotally mounted at the forward end thereof on pivot pin 23 that extends through the legs of a saddle or bracket member 24A that is welded onto each of the respective side frame members 16 of the main frame 11 of the truck, as shown in FIGS. 5, 6 and 7.

Air spring support panels 108 are rigidly supported to the side frame members 16 on each side of the truck, and thus the expansion of air springs 106 results in upward movement of members 104 and corresponding pivotal movement of the side frame members 22.

When retracted, the side frame portions 22 are substantially parallel to a horizontal plane, as shown in FIG. 5.

With the auxiliary axle assembly in its raised position as shown in FIG. 5, the cylinders 56 have to be extended so that the rods move the levers 60 clockwise as shown in FIG. 6, thereby lowering the wheels and moving the latch fingers 61 away from the latch support 65 on each side of the unit. When the rods of the cylinders 56 have been fully extended, air is simultaneously supplied to the air springs 27 and exhausted from the air springs 106. The inflation of air springs 27 provides enough force to overcome the residual pressure forces left in exhausting air springs 106 and serves to lower the base frame portion 20 until the rear wheels contact the ground. The load with which the wheels contact the ground is determined by the pressure of the air in air springs 27. Retraction of the base frame portion 20 is done by removing the air pressure from the springs 27 while simultaneously supplying air pressure to air springs 106, which causes the springs 106 to lift the entire auxiliary axle assembly 15 upwardly, until the base frame portion 20 is in a substantially horizontal position as shown in FIG. 5. Then the hydraulic cylinders 56 are retracted until the latch members 61 fit over the latch supports 65 to hold the unit securely in a retracted position.

The integration of air spring assemblies 102, 102 into the air circuits for operating the auxiliary axle assembly of the present invention is achieved by a slight modification of the air circuitry of the embodiment illustrated in FIG. 4. Three-way air valve 79 is replaced with a four-way air valve 79A. This four-way valve 79A operates such that when air is exhausted from air springs 27, the valve also supplied air through conduits 114 and 114A to air springs 106 which are connected in parallel, thereby causing retraction of the base frame portion 20. To lower the load transfer trailer to its operable position, the action of the four-way valve is reversed such that air is supplied to air springs 27 while at the same time, air is exhausted from air springs 106.

What is claimed is:

1. In combination with a motor vehicle attachment having a body frame, the improvement comprising an auxiliary frame mounted to said body frame to the rear portion of said body frame, said auxiliary frame including a first frame portion pivotally mounted to said body frame, said first frame portion having a rearwardly extending end, and a second frame portion pivotedly mounted to the rearwardly extending end of said first frame portion, wheel means mounted on said second frame portion, first fluid pressure cylinder means for controlling the pivoting of said second frame portion relative to said first frame portion about a generally horizontal axis, and second fluid pressure cylinder means controlling movement of said first frame portion relative to said body frame about an axis generally parallel to the first mentioned axis, spring means mounted between said body frame and said first frame portion operable to urge said first frame portion to an upward position, and control means to control the fluid pressure in said second mentioned fluid pressure cylinder means, and to control pivoting of said second frame portion relative to said first frame portion.

2. The apparatus as specified in claim 1 wherein said second fluid pressure cylinder means comprise air spring means, and said control means for said second fluid pressure cylinder means includes a valve for controlling flow of fluid to said air spring means and for releasing pressure in said air spring means.

3. The combination specified in claim 2 wherein said control means for said first mentioned fluid pressure cylinder means comprises a control valve, said first mentioned fluid pressure cylinder means being double acting cylinder means, said control valve controlling fluid pressure to operate said first mentioned fluid pressure cylinder means in opposite directions under pressure.

4. The combination specified in claim 3 wherein said first frame portion comprises a pair of side frame members pivotedly mounted to said body frame, and a cross member at the rear portions of said side frame members and below portions of the body frame, the second mentioned fluid pressure cylinder means being positioned in the space between said side frame members of said first frame portion, said second mentioned cylinder means being positioned between said cross member and the rear portions of said body frame to exert force tending to separate the rear portions of the body frame and the cross member.

5. The apparatus in claim 1 wherein said second frame portion includes a pair of arms extending rearwardly from the pivotal mounting between the first and second frame portion, an axle mounted to the rear ends of said arms, said axle including mounting yokes at opposite ends thereof, and spindle carrier means mounted in said mounting yokes about generally upright axes, said spindle carrier means each carrying a separate wheel for rotation, said wheels engaging the ground when the auxiliary axle assembly is in an operating position.

6. The apparatus of claim 5 wherein said spindle carrier means on opposite ends of said axle are connected together with a tie rod pivoted to both of the spindle carrier means at positions spaced from the pivot of the yoke to the respective spindle carrier means, and dampener means connected between said spindle carrier means and axle to tend to dampen pivotal movement of the spindle carrier means.

7. The apparatus of claim 1 wherein said second frame portion comprises a pair of arms extending rearwardly, an upwardly extending lever attached to each of said arms, respectively, adjacent the pivot of said second frame portion to said first frame portion, said levers being spaced laterally outwardly from the sides of said body frame, said first frame portion having a pair of side members also spaced outwardly from the sides of said body frame and pivotedly mounted to said body frame, and hydraulic cylinder means between said side members of said first frame portion and said levers, said hydraulic cylinder means comprising said first mentioned fluid pressure cylinders.

8. The combination specified in claim 7 wherein said spring means comprises a pair of leaf springs, means to mount first ends of each of said leaf springs adjacent the sides of said body frame, and means to mount second ends of each of said leaf springs to the respective side frame members of said first frame portion, said leaf springs exerting a force tending to pivot the side frame members upwardly relative to the body frame.

9. The combination specified in claim 8 and cooperating latch means between said lever and said body frame, said latch means engaging to hold the side members of the first frame portion against downward movement when the side frame members are in a raised position and said lever means are in a position with the second frame portion also in a raised position.

10. In combination with a motor vehicle attachment having a body frame, the improvement comprising an auxiliary frame mounted to said body frame to the rear portion of said body frame, said auxiliary frame including a first and second frame portion pivotally mounted together in the midportion of the auxiliary frame, a forward end of said first frame portion being pivoted to the body frame and extending rearwardly from the pivot, wheel means mounted on said second frame portion at a rearwardly extending end, first fluid pressure cylinder means for controlling the pivoting of said second frame portion relative to said first frame portion about a generally horizontal axis, bias means mounted between said body frame and said first frame portion tending to urge said first frame portion and the connected second frame portions, upwardly, means to selectively urge the first frame portion downwardly at a variable force, means to control pivoting of said first frame portion, and releasable mechanical latch means supporting the first frame portion relative to the body frame when the first frame portion is raised.

11. In combination with a motor vehicle attachment having a body frame, the improvement comprising an auxiliary frame mounted to said body frame to the rear portion of said body frame, said auxiliary frame including a first frame portion pivotally mounted to said body frame, said first frame portion having a rearwardly extending end, and a second frame portion pivotally mounted to the rearwardly extending end of said first frame portion, wheel means mounted on said second frame portion, first fluid pressure cylinder means for controlling the pivoting of said second frame portion relative to said first frame portion about a generally horizontal axis, second fluid pressure cylinder means controlling movement of said first frame portion downwardly relative to said body frame about an axis generally parallel to the first mentioned axis, third fluid pressure cylinder means controlling movement of said first frame portion upwardly relative to said body frame about said axis generally parallel to the first mentioned axis, and control means to control the fluid pressure in said second mentioned fluid pressure means, to control the fluid pressure in said third mentioned fluid pressure means, and to control pivoting of said second frame portion relative to said first frame portion.

12. The apparatus as specified in claim 11 wherein said third fluid pressure cylinder means comprise air spring means, and said control means for said third fluid pressure cylinder means includes a valve for controlling flow of fluid to air spring means and for releasing pressure in said air spring means.

13. The apparatus as specified in claim 12 wherein said spring means comprises a pair of air springs, means to mount first ends of said air springs adjacent the sides of said body frame, and means to mount second ends of said air springs to the respective sideframe members of said first frame portion, whereby upon expansion, said air springs exert a force tending to pivot the side frame members upwardly relative to the body frame.

* * * * *